Oct. 5, 1948. C. W. KERR 2,450,598
BICYCLE
Filed Dec. 20, 1944 2 Sheets-Sheet 1
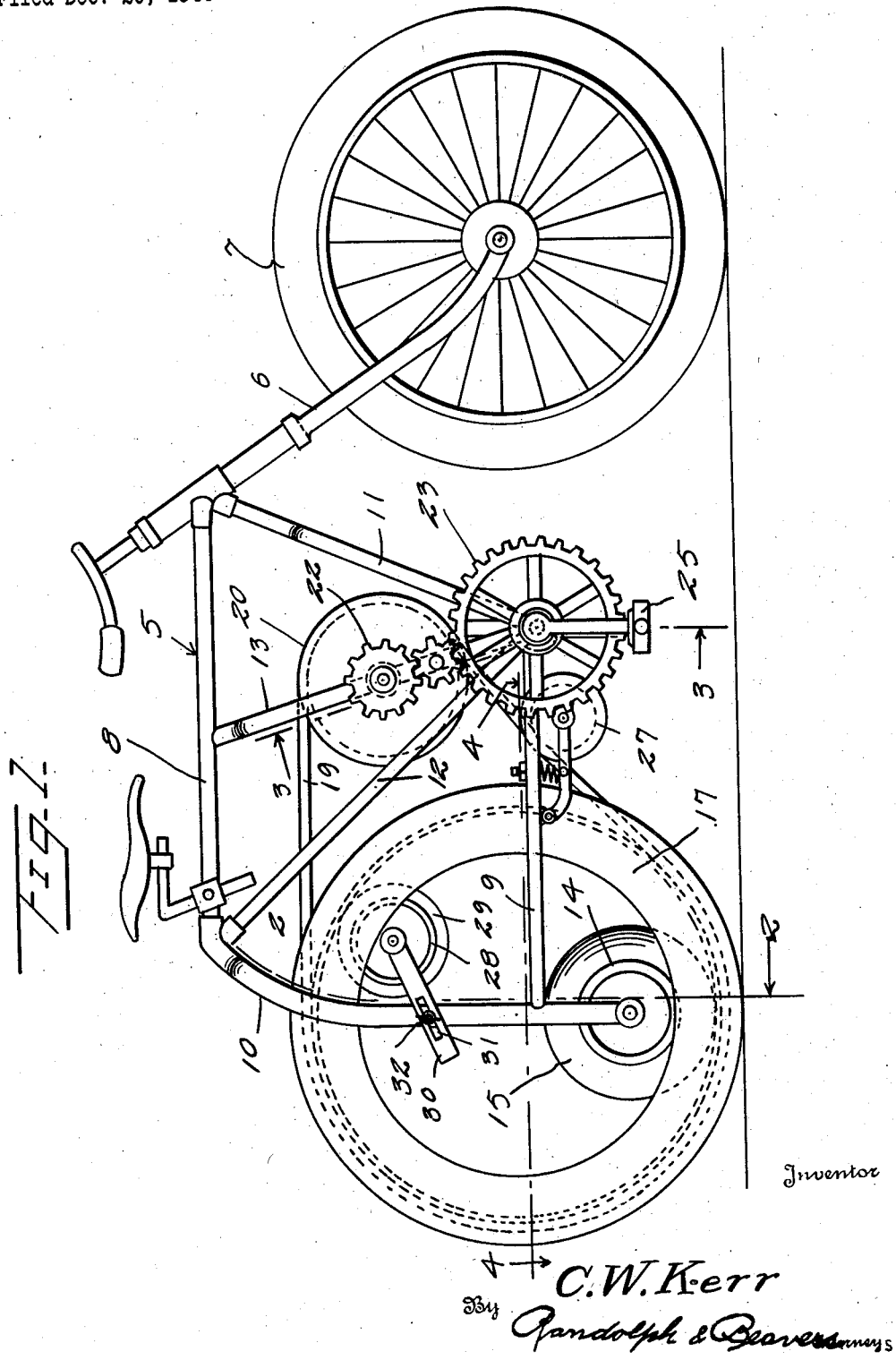
Inventor
C. W. Kerr
By Randolph & Beavers Attorneys Oct. 5, 1948.  C. W. KERR  2,450,598
BICYCLE
Filed Dec. 20, 1944  2 Sheets-Sheet 2
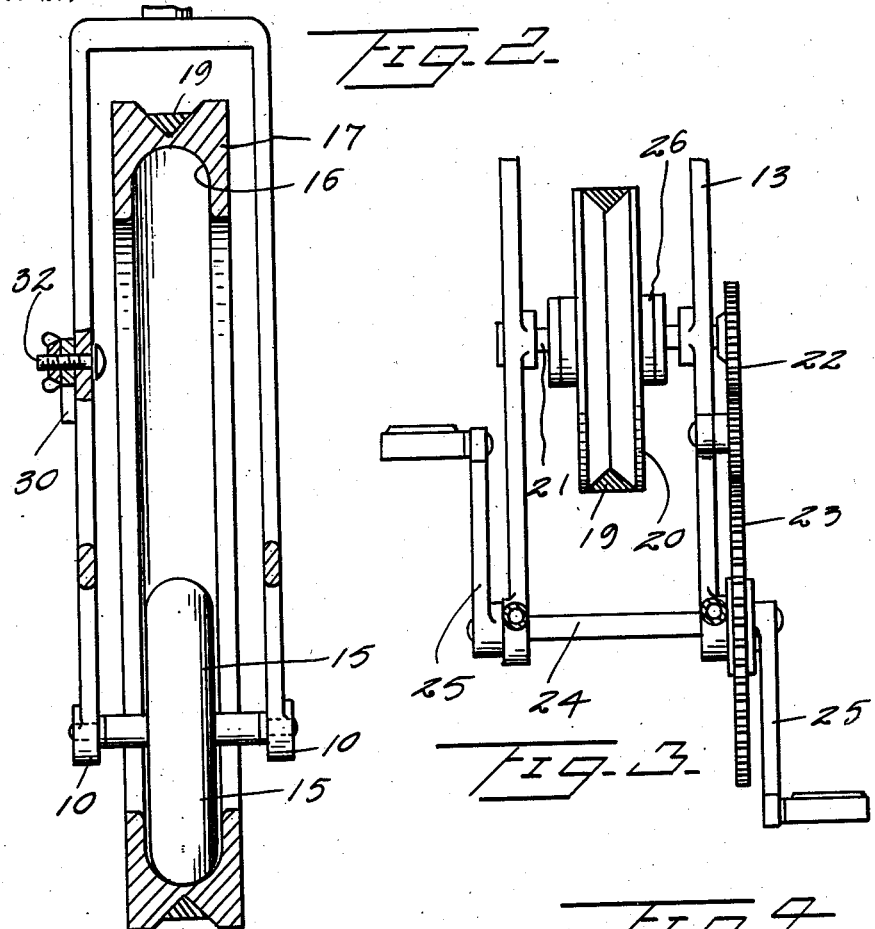
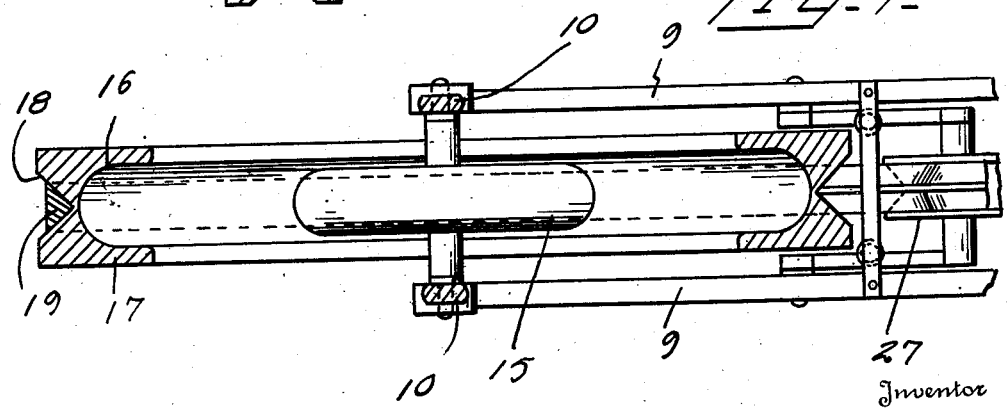
Inventor
C. W. Kerr
By Randolph & Beavers
Attorneys Patented Oct. 5, 1948

2,450,598

UNITED STATES PATENT OFFICE 2,450,598

BICYCLE

Cornelius W. Kerr, Panama City, Fla.

Application December 20, 1944, Serial No. 569,060

2 Claims. (Cl. 280—261)

The present invention relates to new and useful improvements in bicycles and more particularly to a novel driving mechanism therefor.

An important object of the present invention is to provide a bicycle drive mechanism including a belt driven rear wheel and supporting the frame of the bicycle on the rear wheel at its lowermost point, or in the region of its point of traction and applying the driving power at the top of the wheel whereby to increase the driving power generated by the pedals of the bicycle.

A further object of the invention is to provide a driving mechanism for bicycles by means of which less effort is required to operate the same and which at the same time is simple and practical in construction, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a vertical sectional view through the rear wheel taken substantially on a line 2—2 of Figure 1.

Figure 3 is a similar view through the pedal operated gearing for driving the rear wheel and taken substantially on a line 3—3 of Figure 1, and Figure 4 is a horizontal sectional view taken substantially on a line 4—4 of Figure 1.

Referring now to the drawings in detail wherein for the purpose of illustration I have disclosed a preferred embodiment of the invention, the numeral 5 designates the bicycle frame generally which includes the front fork 6 having the front wheel 7 journaled at the lower ends thereof, the frame also including upper and lower horizontal frame members 8 and 9 connected at their rear ends by a vertical rear wheel frame 10. The front end of the lower horizontal frame 9 is connected to the upper horizontal frame 8 by a front inclined frame member 11, a rear inclined frame member 12 and an intermediate inclined frame member 13 to thus provide a rigid construction for the frame.

The rear wheel frame member 10 is in the form of a yoke as shown to advantage in Figure 2 of the drawings and has a wheel 14 journaled at its lower end provided with a pneumatic tire 15. The wheel 14 is mounted to travel within an internal circumferentially extending groove 16 of a rear wheel 17.

The wheel 17 is also formed in its periphery with a V-shaped belt groove 18 in which a V-belt 19 is seated, the belt being driven by a pulley 20 secured on a shaft 21 journaled in the intermediate frame 13. To one end of the shaft 21 is attached a gear 22 driven by a gear 23 of increased gear ratio and which is attached to a shaft 24 journaled at the junction of the frame members 11, 12 and 13 with the front end of the lower horizontal frame member 9. The shaft 24 has the pedals 25 attached to the ends thereof.

Also operatively connected with the pulley 20 and shaft 21 is a conventional form of coaster brake mechanism 26.

A conventional form of belt tightener 27 is attached to the lower horizontal frame 9 for engaging the lower flight of the belt 19 at a point between the rear wheel 17 and the pulley 20 to maintain proper tension on the belt.

The rear wheel 17 is supported against movement relative to the frame 5 by means of an upper wheel 28 having a pneumatic tire 29 mounted thereon and also adapted to travel in the groove 16 at a point therein substantially diametrically opposite from the wheel 14. The wheel 28 is journaled in a bracket 30 having a slot 31 formed therein for securing the bracket in adjusted position relative to the rear frame member 10 by means of a bolt and wing nut 32.

In the operation of the device the rear wheel 17 is driven by the belt 19 from the pulley 20 and which, in turn, is driven by the pedals 25 through the gears 22 and 23.

The driving force for the rear wheel 17 is exerted by the upper flight of the belt 19 at the top of the wheel 17 and the load of the bicycle is supported on the drive wheel 17 at its lowermost point and at its point of traction. Accordingly, the driving power for the wheel 17 and generated by the pedals 25 is increased and accordingly less power will be necessary during the normal driving of the bicycle.

It is believed that the details of construction, operation and advantages of the device will be readily understood from the foregoing without further detailed explanation.

Having thus described the invention, what I claim is:

1. A drive mechanism for bicycles comprising a wheel having a circumferential external groove, a manually operated propulsion unit including a belt disposed over the wheel and in the groove, said wheel having a circumferential inner groove upper and lower wheels engaging the inner groove of the wheel to prevent displacement of the latter, a frame for supporting the wheels and the propulsion means.

2. A bicycle comprising a frame, a front wheel, an annulus serving as a rear wheel, said wheel and annulus being carried by the frame, a crank shaft having foot pedals, a gear operated by the crank shaft, a pulley mounted on a shaft, gear means between the pulley and the first mentioned gear, said annulus being formed with a circumferential external groove, a drive belt from the pulley as disposed around the annulus in said groove, said annulus being formed with a circumferential inner groove, said frame being provided with a wheel for riding engagement in the inner groove, an idler wheel carried by the frame for riding engagement with the annulus at the inside groove and being located substantially opposite the first mentioned wheel in the annulus, said idler wheel being provided with adjusting means on said frame.

CORNELIUS W. KERR.

REFERENCES CITED

The following references are of record in the file of this patent:

UNITED STATES PATENTS

| Number | Name | Date |
|---|---|---|
| 380,601 | Sickler | Apr. 3, 1888 |
| 566,275 | McIntire | Aug. 18, 1896 |
| 578,618 | Atkinson | Mar. 9, 1897 |